United States Patent
Kreisler

[19]

[11] Patent Number: 6,152,339
[45] Date of Patent: Nov. 28, 2000

[54] VEHICLE ROOFTOP CARRIER APPARATUS

[76] Inventor: Stewart Olson Kreisler, 105 Green St., Wakefield, Mass. 01880

[21] Appl. No.: 09/535,152

[22] Filed: Mar. 24, 2000

Related U.S. Application Data

[63] Continuation-in-part of application No. 09/136,826, Aug. 20, 1998.

[51] Int. Cl.[7] ............................................... B60R 9/00

[52] U.S. Cl. ..................... 224/319; 224/309; 224/310

[58] Field of Search .................................. 224/319, 309, 224/310, 402, 413; 296/37.7; 403/385, 389

[56] References Cited

U.S. PATENT DOCUMENTS

| | | |
|---|---|---|
| 4,538,752 | 9/1985 | Welter . |
| 4,817,897 | 4/1989 | Kreusel ................................ 248/68.1 |
| 5,492,259 | 2/1996 | Tippetts .................................. 224/494 |

OTHER PUBLICATIONS

*The Authority on Jeep, Sidekick & Tracker*, Keystone Automotive Warehouse (1997).

Five photographs taken at Camp Jeep in Colorado (Aug. 1998).

*Primary Examiner*—Gregory M. Vidovich
*Assistant Examiner*—Maerena Brevard
*Attorney, Agent, or Firm*—Fish & Richardson P.C.

[57] ABSTRACT

A vehicle carrier rack assembly for mounting upon the roof of the vehicle includes a cooperative clamping assembly for releasably mounting the carrier rack upon a vehicle roll bar. The rack assembly may further include at least one grommet assembly mounted at a hole formed in the vehicle roof and passing therethrough, in water-tight relationship, a portion of the cooperative, releasable engagement assembly for the vehicle rack. In other embodiments, the rack is hinged to pivot between a first position adjacent the vehicle roof and a second position spaced therefrom, e.g., to facilitate removal and replacement of the vehicle roof. A ladder may be mounted to the carrier rack at the rear of the vehicle to similar purpose.

22 Claims, 9 Drawing Sheets

VEHICLE ROOFTOP CARRIER APPARATUS

This application is a continuation-in-part of U.S. Application Ser. No. 09/136,282, filed Aug. 20, 1998, and now allowed.

TECHNICAL FIELD

This invention relates to a rack carrier for mounting atop a convertible sport utility vehicle (SUV) and the like.

BACKGROUND

Convertible SUV vehicles, such as JEEP®, LAND ROVER®, GAZELLE® sports utility vehicles and the like, offer the benefit of rugged performance for off-road use, while at the same time allowing the open-air enjoyment of a removable top. The tops can be removable hard tops or flexible tops made, e.g., of fabric, coated canvas, and the like.

A major disadvantage of such sport utility vehicles is their relative lack of cargo space. Any cargo that is carried must essentially be accommodated within the passenger compartment, which is limited. For situations where large items are desired to be transported, the interior cargo space of many sports utility vehicles is inadequate.

The prior art teaches various vehicle rooftop carrier apparatus, but offers few solutions for convertible sports utility vehicles. This is because most vehicle rooftop carriers rely upon the rain gutters for mounting, or rely upon the roof of a hardtop vehicle for support. Since convertible sports utility vehicles lack these features, most prior art rooftop carriers are not suitable for use with these types of vehicles. Prior art racks for convertible sports utility vehicles are described, e.g., in Welter U.S. Pat. No. 4,538,752 and by Steel Horse Automotive.

SUMMARY

According to one aspect of the invention, a cooperative clamping assembly for releasably mounting a carrier rack upon a vehicle roll bar comprises: a roll bar clamp assembly comprising: a lower roll bar clamp element defining a lower bar clamping surface for engagement with a roll bar surface, an upper roll bar clamp element defining an upper bar clamping surface for engagement with a roll bar surface, and at least one roll bar clamp assembly securement element securing together the lower roll bar clamp and the upper roll bar clamp, with the roll bar engaged generally within and between opposed the lower bar clamping surface and the upper bar clamping surface; a carrier rail clamp assembly comprising: a lower carrier rail clamp element defining a lower rail clamping surface for engagement with a carrier rail surface, an upper carrier rail clamp element defining an upper rail clamping surface for engagement with a carrier rail surface, and at least one carrier rail clamp assembly securement element securing together the lower carrier rail clamp and the upper carrier rail clamp, with the carrier rail engaged generally within and between opposed the lower rail clamping surface and the upper rail clamping surface; and a cooperative, releasable engagement assembly comprising: a male engagement element associated with one of the roll bar clamp assembly and the carrier rail clamp assembly, a female sleeve element defining a bore for cooperatively receiving the male engagement element extending therewithin and associated with another of the roll bar clamp assembly and the carrier rail clamp assembly, and at least one releasable engagement assembly securing element releasably securing the male engagement element in engagement within the bore of the female sleeve element.

Preferred embodiments of this aspect of the invention may include one or more of the following additional features. The male engagement element is associated with the roll bar clamp assembly, preferably with the male engagement element extending generally vertically upward from the upper roll bar clamp element of the roll bar clamp assembly, for releasable engagement extending within the bore of the female sleeve element. The female sleeve element is associated with the carrier rail clamp assembly, preferably with the female sleeve element extending generally vertically downward from the lower carrier rail clamp element of the carrier rail clamp assembly, for releasable engagement of the bore over the male engagement element. The male engagement element and the female sleeve element define respective transverse apertures in cooperative alignment when the male engagement element extends within the bore of the female sleeve element, and the releasable engagement assembly securing element extends through the transverse apertures in cooperative alignment, releasably securing the male engagement element against dislodgement from within the bore of the female sleeve element. Preferably, the cooperative clamping assembly further comprises disengageable interference structure associated with the releasable engagement assembly securing element for resisting its dislodgement from the transverse apertures in cooperative alignment.

According to another aspect of the invention, a vehicle carrier rack assembly for removably mounting upon a vehicle having a roll bar comprises the unitary carrier rack and cooperative clamping assembly for releasably mounting the unitary carrier rack upon the vehicle roll bar, as described above.

According to yet another aspect of the invention, a vehicle with a roll bar and a vehicle carrier rack assembly removably mounted upon the roll bar comprises the unitary carrier rack and cooperative clamping assembly for releasably mounting the unitary carrier rack upon the vehicle roll bar, as described above.

Preferred embodiments of both of the immediately preceding aspects of the invention may include one or more of the following additional features. The vehicle further comprises at least one grommet assembly for mounting upon the roof of the vehicle around a hole formed therein, and receiving therethrough, in water-tight relationship, a portion of the cooperative, releasable engagement assembly, wherein the roof of the vehicle passes between the roll bar of the vehicle and the unitary carrier rack. The unitary carrier rack has sidewalls and a floor; preferably, the sidewalls comprise lower and upper siderail members, reinforcement members between the lower and upper siderail members, and corner posts, and the floor of the unitary carrier rack comprises the lower siderail members, bottom rail members and cross rail members.

According to still another aspect of the invention, a vehicle carrier rack assembly for removably mounting upon a vehicle having a roll bar comprises: a unitary carrier rack; a front rack support bar adapted for mounting to windshield brackets of the vehicle; and at least one carrier rack hinge assembly comprising: first and second outer rack hinge elements extending from one of the front rack support bar and the unitary carrier rack, an inner rack hinge element extending from another of the front rack support bar and the unitary carrier rack and generally between the first and second outer rack hinge elements, and a hinge pin, the inner rack hinge element and the first and second outer rack hinge elements defining respective transverse apertures in cooperative alignment for receiving the hinge pin therethrough, whereby the unitary carrier rack is pivotable about an axis, defined by the hinge pin, between a first position, with the unitary carrier rack disposed adjacent the vehicle roof, and a second position, with the unitary carrier rack pivoted away and spaced from the vehicle roof.

Preferred embodiments of this aspect of the invention may include one or more of the following additional features. The first and second outer rack hinge elements extend from the front rack support bar and the inner rack hinge element extends from the unitary carrier rack. The vehicle carrier rack assembly further comprises the cooperative clamping assembly for releasably mounting the unitary carrier rack upon the vehicle roll bar, as described above. Preferably, the vehicle carrier rack assembly also further comprises at least one grommet assembly for mounting upon the roof of the vehicle around a hole formed therein for receiving therethrough, in water-tight relationship, with the unitary carrier rack in the first position, a portion of the cooperative, releasable engagement assembly, also as described above. The vehicle carrier rack assembly further comprises: a ladder mounted at the rear of the vehicle; and at least one ladder hinge assembly comprising: first and second outer ladder hinge elements extending from one of the unitary carrier rack and the ladder, an inner ladder hinge element extending from another of the unitary carrier rack and the ladder and generally between the first and second outer ladder hinge elements, and a hinge pin, the inner ladder hinge element and the first and second outer ladder hinge elements defining respective transverse apertures in cooperative alignment for receiving the hinge pin therethrough, whereby the ladder is pivotable about an axis, defined by the ladder hinge pin, between a first position, with the ladder extending at the rear of the vehicle, with a first, free end disposed for access from the ground, and a second position, with the ladder pivoted away and spaced from the rear of the vehicle. The first and second outer ladder hinge elements extend from the unitary carrier rack and the inner ladder hinge element extends from the ladder. The ladder has a second, upper end, opposite the first end, with the ladder in the first position, the second end being disposed for access to the unitary carrier rack.

The invention thus provides a vehicle carrier rack assembly that can be removably mounted on a vehicle having a roll bar by means of releasable clamp assemblies, the rack consisting of a unitary rack member, e.g., having sidewalls and a floor, the clamp assemblies mounting the vehicle carrier rack to the vehicle roll bar. For use with a convertible sports utility vehicle having a roof, the vehicle rack assembly further has grommet assemblies mounted about holes formed in the vehicle roof for passing the clamp assemblies therethrough, the vehicle roof being positioned between the roll bar and the vehicle rack assembly. The rack may be mounted to the vehicle by hinges, e.g., to allow the rack to be pivoted between a travel position and a raised position to facilitate removal and replacement of the vehicle roof. A ladder may also be attached to the rack at the rear of the vehicle, e.g. for ease of access to the rack on the vehicle roof. The ladder may be attached to the rack by hinges, permitting it to be moved away from the rear of the vehicle, e.g. for access to the rear passenger compartment, or to facilitate removing or replacing the vehicle roof. Features of the invention may also include a unitary, welded rack providing greater strength and eliminate the rattle of loosened bolts.

The vehicle rack assembly is also easily placed on and removed from the vehicle, and it does not interfere with convenient removal and replacement of the convertible top of a sport utility vehicle. The rack is also attractive and does not require any aesthetically undesirable supports to remain on the vehicle when the rack is not attached.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
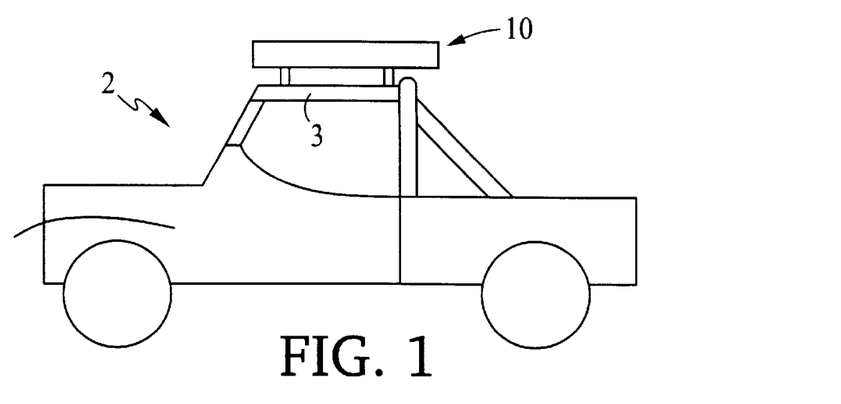
FIG. 1 is a somewhat diagrammatic side view of a sports utility vehicle ("SUV") equipped with a vehicle carrier rack according to the invention.
Figure 2:
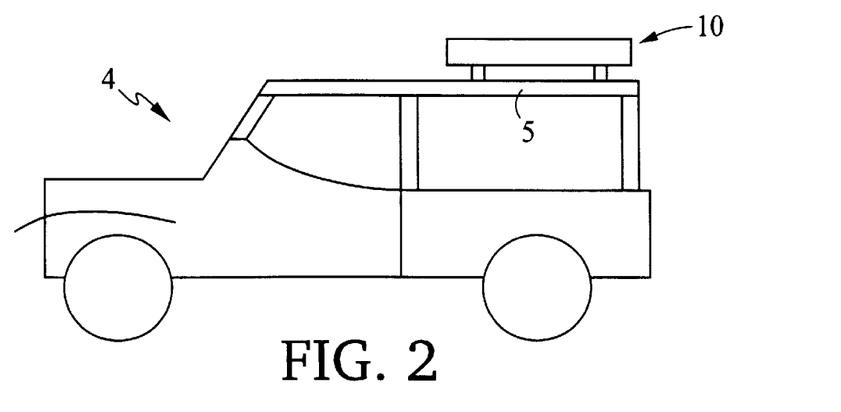
FIG. 2 is a similar diagrammatic side view of another type of sports utility vehicle equipped with a vehicle carrier rack of the invention.
Figure 3:
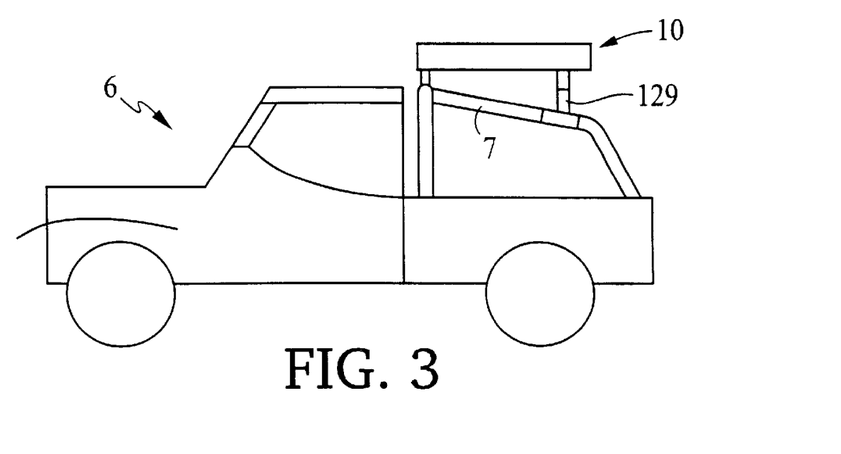
FIG. 3 is a similar diagrammatic side view of still another type of sports utility vehicle equipped with a vehicle carrier rack of the invention.

Referring to FIGS. 1, 2 and 3, a vehicle carrier rack 10 of the invention is shown removably mounted upon the roll bar of each of several different configurations of sports utility vehicles. In particular, FIG. 1 depicts a vehicle carrier rack 10 on a sports utility vehicle 2 having a forward, over-cab roll bar 3, e.g., as found on JEEP® CJ™ model sports utility vehicles; FIG. 2 depicts the vehicle carrier rack 10 mounted on a sports utility vehicle 4 having parallel horizontal rear roll bar members 5, e.g., as found on 1997 model year and later JEEP® WRANGLER™ models; and FIG. 3 depicts the vehicle carrier rack 10 mounted on a sports utility vehicle 6 having rear roll bar members 7 disposed at an angle to the horizontal, e.g., as found on JEEP® WRANGLER™ models made prior to the 1997 model year.

Figure 4:
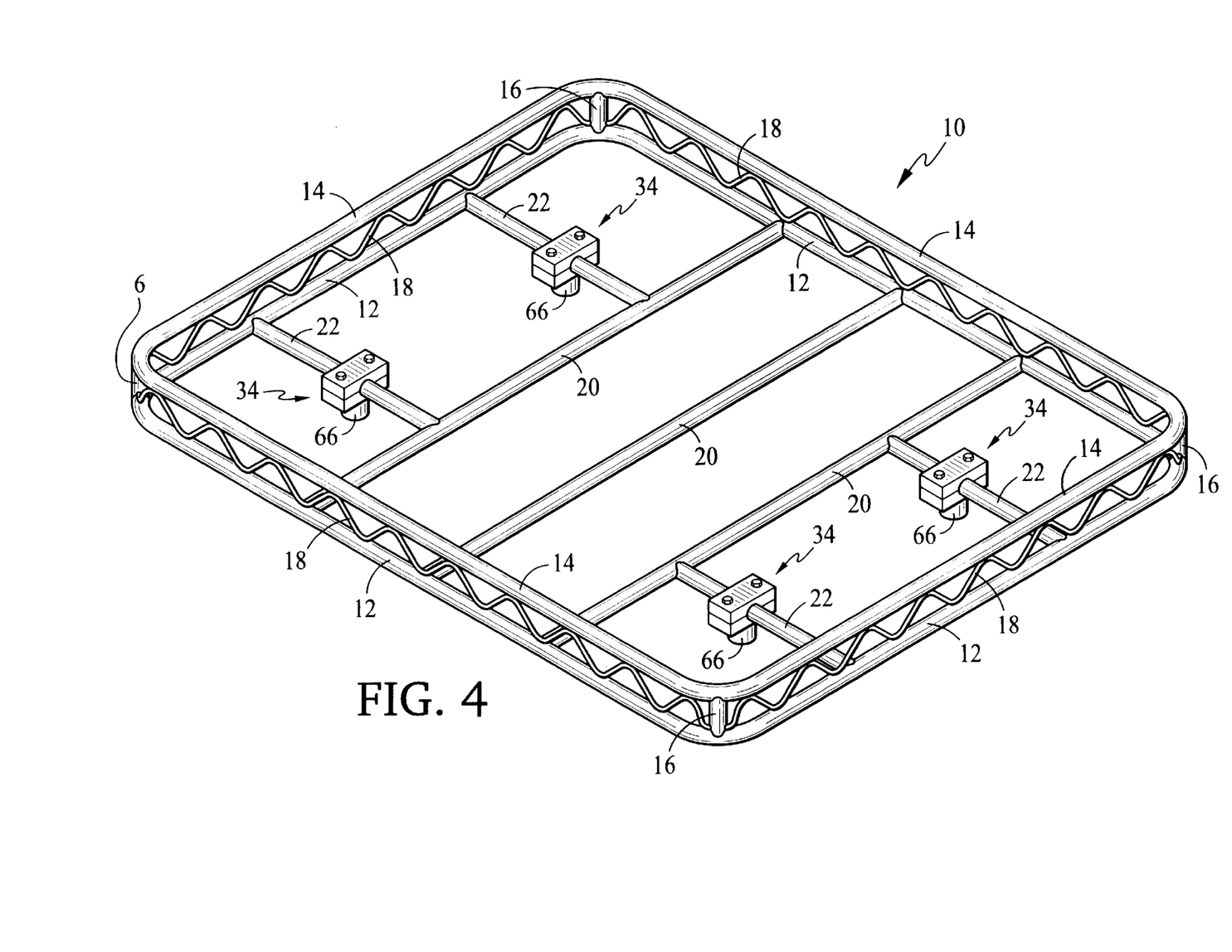
FIG. 4 is a perspective view of a vehicle carrier rack of the invention.

Referring now to FIG. 4, a vehicle carrier rack 10 includes a lower siderail member 12 and an upper siderail member 14, each extending about the entire perimeter of the rack 10. The upper siderail member 14 is mounted atop corner posts 16. Reinforcement members 18, shown, by way of example, as continuous serpentine elements on each side, support the construction. Bottom rail members 20 span between opposite segments of the lower siderail member 12, and bottom crossrail members 22 span between the outermost bottom rail members 20 and adjacent, opposite segments of the lower siderail 12. Crossrail members 22 may also be provided between the bottom rail members 20. Carrier rail clamp assemblies 34 of cooperative clamping assemblies 30 for releasably mounting the vehicle carrier rack 10 upon a vehicle roll bar, as shown in FIGS. 1–3 and described more fully below, are positioned on the crossrail members 22, e.g., as depicted in FIG. 4, or, alternatively, on the lower siderail member 12 or the bottom rail members 20, the locations being selected, e.g., as necessary to accommodate the particular types of vehicle upon which the vehicle carrier rack 10 is to be mounted.

In one preferred embodiment, the vehicle carrier rack 10 is formed of 1½ inch diameter tubular metal stock, e.g. aluminum. The overall construction is preferably welded for strength. Alternatively, the vehicle carrier rack 10 may be formed, e.g., of suitable high-impact plastic, e.g., molded in part or in its entirety, or other suitable material. Composite materials, such as those known in the art, may also be used.

Figure 5:
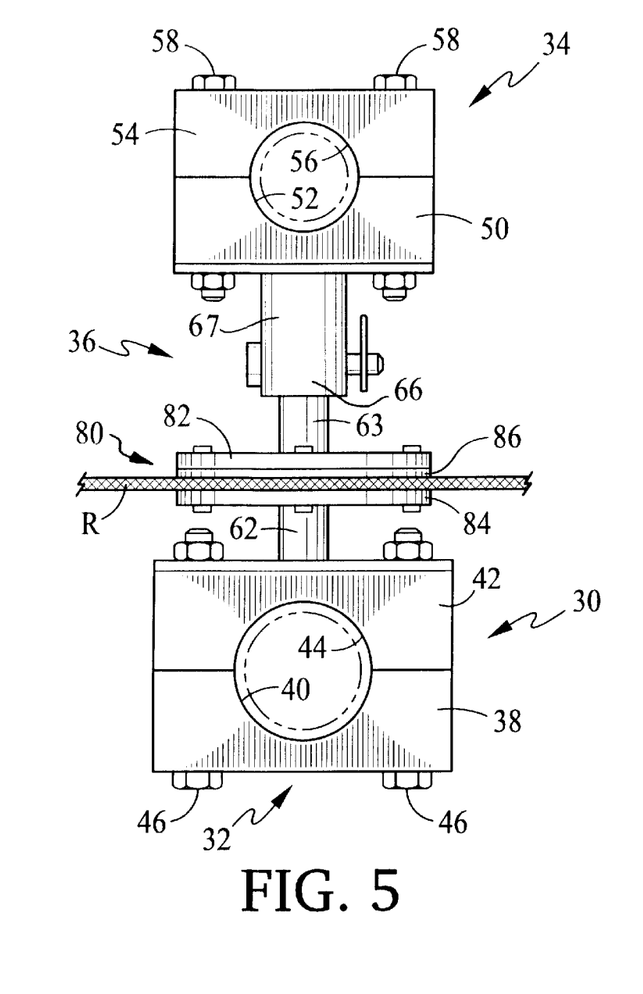
FIGS. 5 and 6 are face plan and side plan views, respectively, of a cooperative clamping assembly of the invention, for releasably mounting a carrier rack upon a vehicle roll bar.
Figure 6:
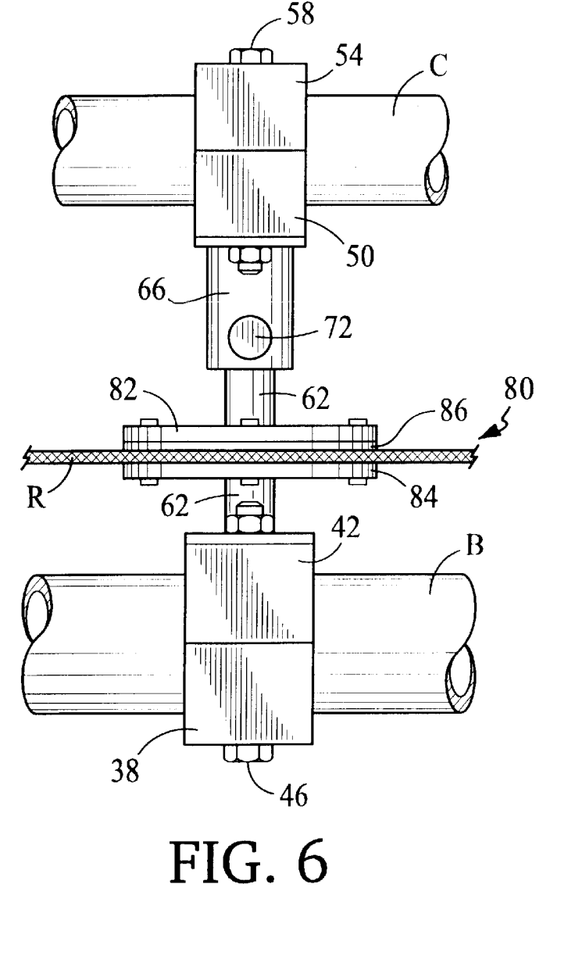
Figure 7:
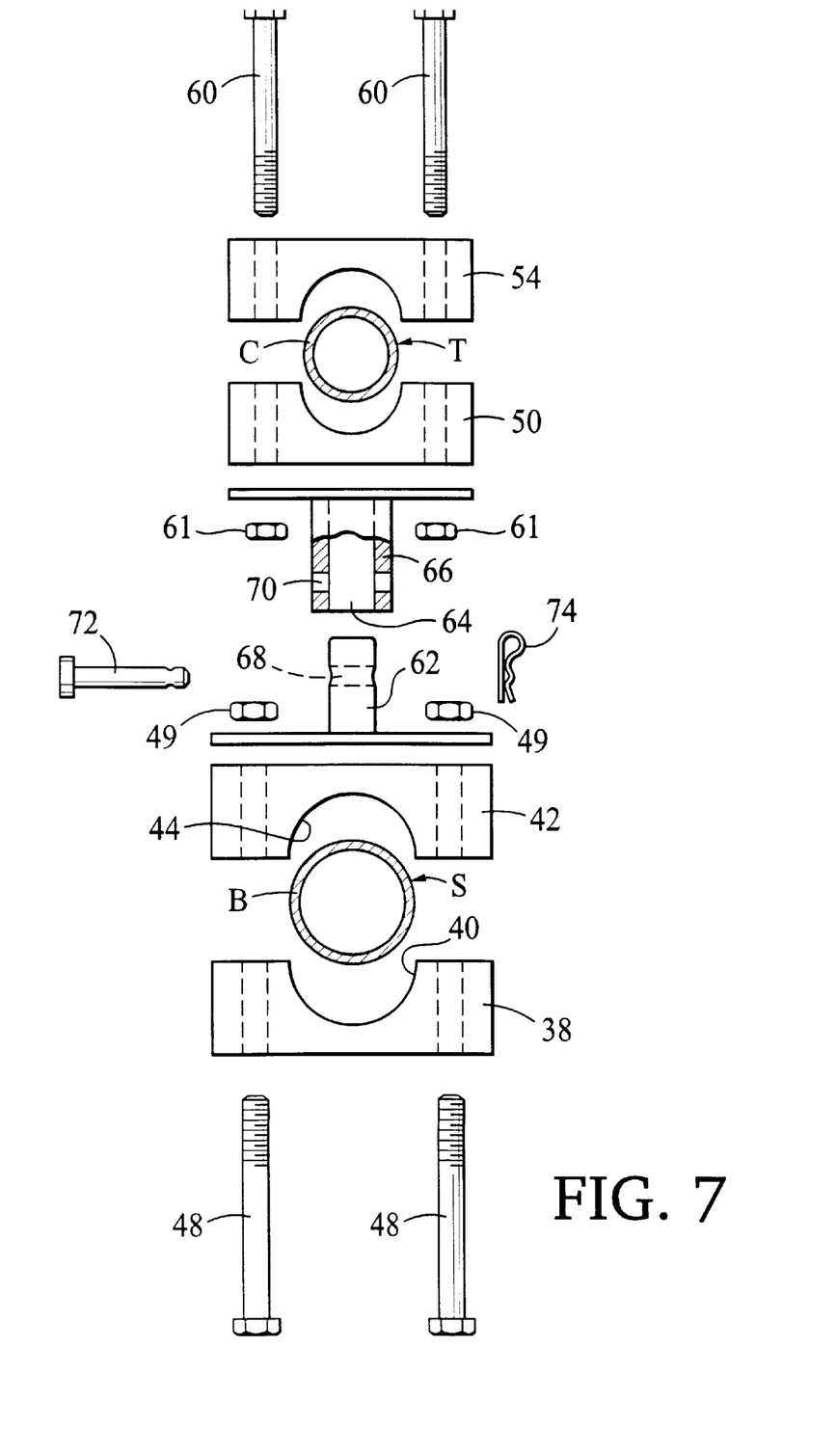
FIG. 7 is an exploded view of the cooperative clamping assembly of FIGS. 5 and 6.

Referring now to FIGS. 5, 6 and 7, a cooperative clamping assembly 30 of the invention for releasably mounting a carrier rack 10 upon a vehicle roll bar includes a roll bar clamp assembly 32, a carrier rail clamp assembly 34, and a cooperative, releasable engagement assembly 36. The roll bar clamp assembly 32 includes a lower roll bar clamp element 38 defining a lower bar clamping surface 40 for engagement with a roll bar surface, S (FIG. 7), an upper roll bar clamp element 42 defining an upper bar clamping surface 44 for engagement with a roll bar surface, S, and roll bar clamp assembly securement elements 46, e.g. bolts 48 and nuts 49, engaged in apertures provided for the purpose, securing together the lower roll bar clamp 38 and the upper roll bar clamp 42, with the vehicle roll bar, B, engaged generally within and between opposed the lower bar clamping surface 40 and the upper bar clamping surface 44. The carrier rail clamp assembly 34 includes a lower carrier rail clamp element 50 defining a lower rail clamping surface 52 for engagement with a carrier rail surface, T (FIG. 7), an upper carrier rail clamp element 54 defining an upper rail clamping surface 56 for engagement with a carrier rail surface, T, and carrier rail clamp assembly securement elements 58, e.g. bolts 60 and nuts 61, engaged in apertures provided for the purpose, securing together the lower carrier rail clamp 50 and the upper carrier rail clamp 54, with the carrier rail, C, engaged generally within and between opposed the lower rail clamping surface 52 and the upper rail clamping surface 56. The cooperative, releasable engagement assembly 36 includes a male engagement element 62 extending generally vertically upward from the upper roll bar clamp element 42 of the roll bar clamp assembly 32, for releasable engagement extending within a bore 64 of a female sleeve element 66 sized and configured for cooperatively receiving the male engagement element 62 extending therewithin. The female sleeve element 66 extends generally vertically downward from the lower carrier rail clamp element 50 of the carrier rail clamp assembly 34, for releasable engagement of the bore 64 over the male engagement element 62. The male engagement element 62 and the female sleeve element 66 define respective transverse apertures 68, 70 in cooperative alignment (with male engagement element 62 extended within the bore 64 of the female sleeve element 66), and a releasable engagement assembly securing element, e.g. pin 72, extends through the transverse apertures 68, 70 in cooperative alignment, releasably securing the male engagement element 62 against dislodgement from within the bore 64 of the female sleeve element 66. A disengageable interference structure, e.g., cotter pin 74, is associated with the releasable engagement assembly securing element 72 for resisting its dislodgement from the transverse apertures 68, 70 in cooperative alignment.

Figure 8:
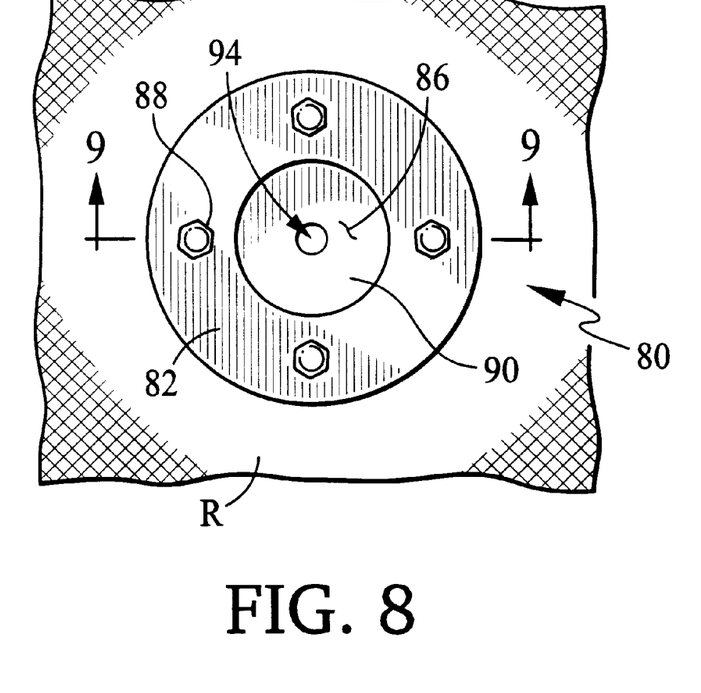
FIGS. 8 and 9 are top plan and side section views, respectively, of a grommet assembly of the invention, for mounting upon the roof of the vehicle around a hole formed therein for receiving therethrough, in water-tight relationship, a portion of the vehicle carrier rack.
Figure 9:
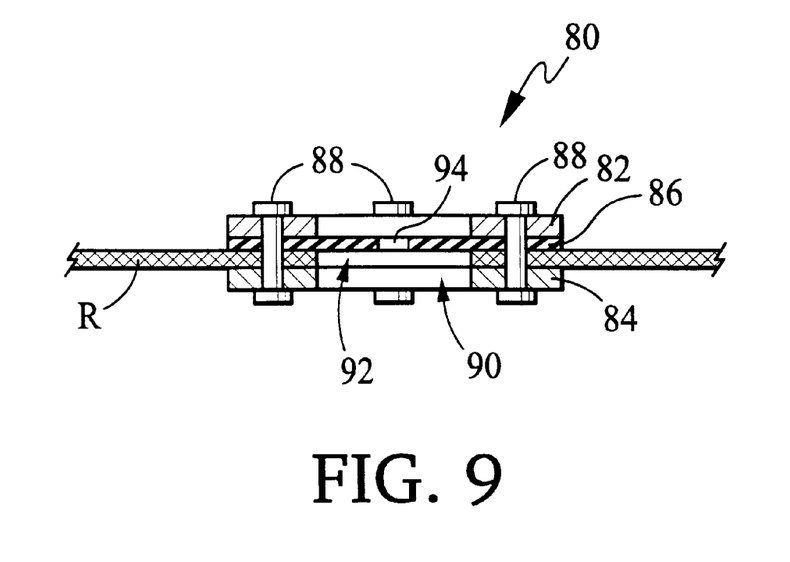

As shown in FIGS. 5 and 6, a roof grommet assembly 80 is provided for allowing the female sleeve element 66, or, in the preferred embodiment, allowing the male engagement element 62, of the cooperative clamping assembly 30 to pass through the roof, R, of the vehicle. The grommet assembly 80 is depicted in FIGS. 8 and 9 in greater detail. The roof, R, of the vehicle may be either a soft fabric top, or a hard top, such are known in the sports utility vehicle market. A pair of annular plates 82, 84 are positioned at opposite surfaces of the roof, R, with a seal disk 86 of suitable resilient material, e.g. rubber, between the outer annular plate 82 and the outside surface of the vehicle roof, R. The annular plates 82, 84 are then secured together, with the seal disk 86 and roof material therebetween, by attachment members 88, which are preferably rivets, but can be bolts or other attachment members known in the art. The hole 90 at the center of the annular plates 82, 84 corresponds to a hole 92 formed for the purpose in the roof, R, of the vehicle, and to a small, resiliently expandable hole 94 in the center of the seal disk 86. As shown in FIG. 6, in the preferred embodiment, the male engagement element 62 of the cooperative clamping assembly 30 is received through the aligned holes 90, 92, 94 of the annular plates, 82, 84, the vehicle roof, R, and the seal disk 86, respectively, with the hole 94 in the seal disk 86 expanding resiliently to allow the male engagement element 62 to pass therethrough, the material of the seal disk 86 about the hole 94 engaging the outer surface 63 of the male engagement element 62 in water-tight relationship. The male engagement element 62 is sized such that the riding height of the grommet assembly 80 allows for adequate access to the releasable engagement assembly securing element (pin 72) from outside the vehicle.

The grommet assembly 80 is depicted as accommodating the male engagement element 62, such that when the vehicle carrier rack 10 is removed (by removing the releasable engagement assembly securing element (pin 72)) and lifting the rack 10 and the carrier rail clamp assembly 34, with the female sleeve element 66 attached thereto, the upwardly-extending male engagement element 62 remains engaged within the hole 94 in the sealing disk 86, extending above the surface of the vehicle roof, R, with the material of the seal disk 86 about the hole 94 remaining engaged with the outer surface 63 of the male engagement element 62 in water-tight relationship.

Figure 16:
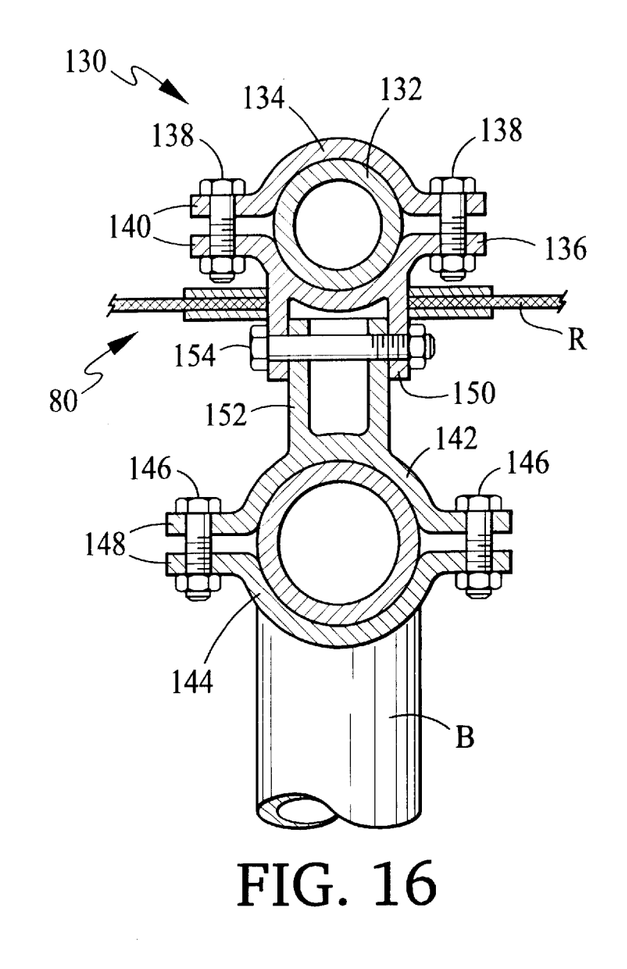
FIGS. 16 and 17 are face plan and side plan views, respectively, of another embodiment of a cooperative clamping assembly of the invention.

In an alternate embodiment (e.g., as shown in FIG. 16), when the vehicle carrier rack is removed from the vehicle, the upwardly extending male engagement element 152 is sized to end only within the vehicle, i.e., below the roof, R. In this embodiment, if necessary, the grommet assembly hole 94 may be suitably plugged in known fashion, e.g. with the plug advantageously secured to the male engagement element.

Figure 10:
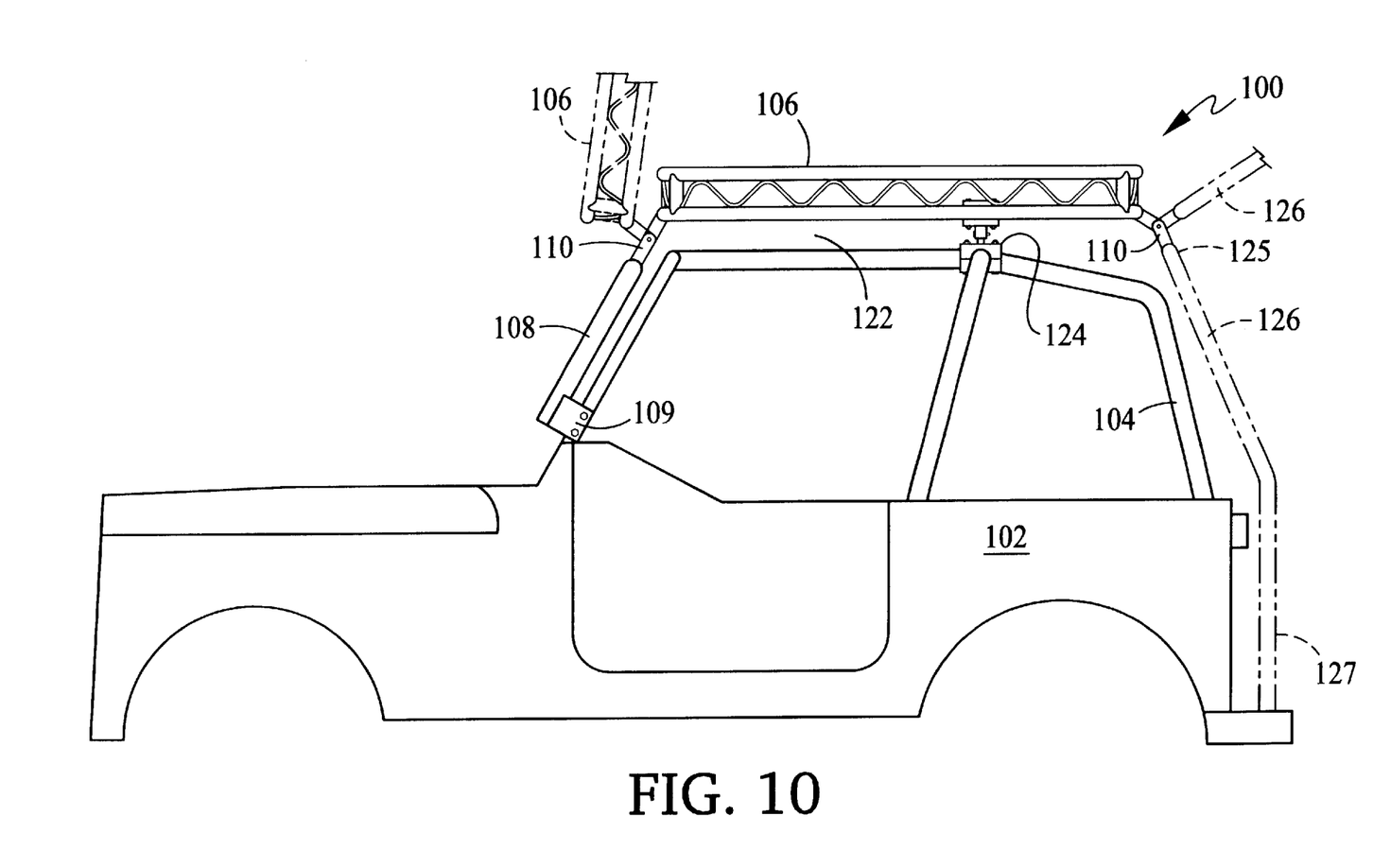
FIG. 10 is a somewhat diagrammatic side view of a sports utility vehicle equipped with a vehicle carrier rack pivotably-mounted thereto, and a ladder pivotably-mounted to the rack, according to other embodiments of the invention.
Figure 11:
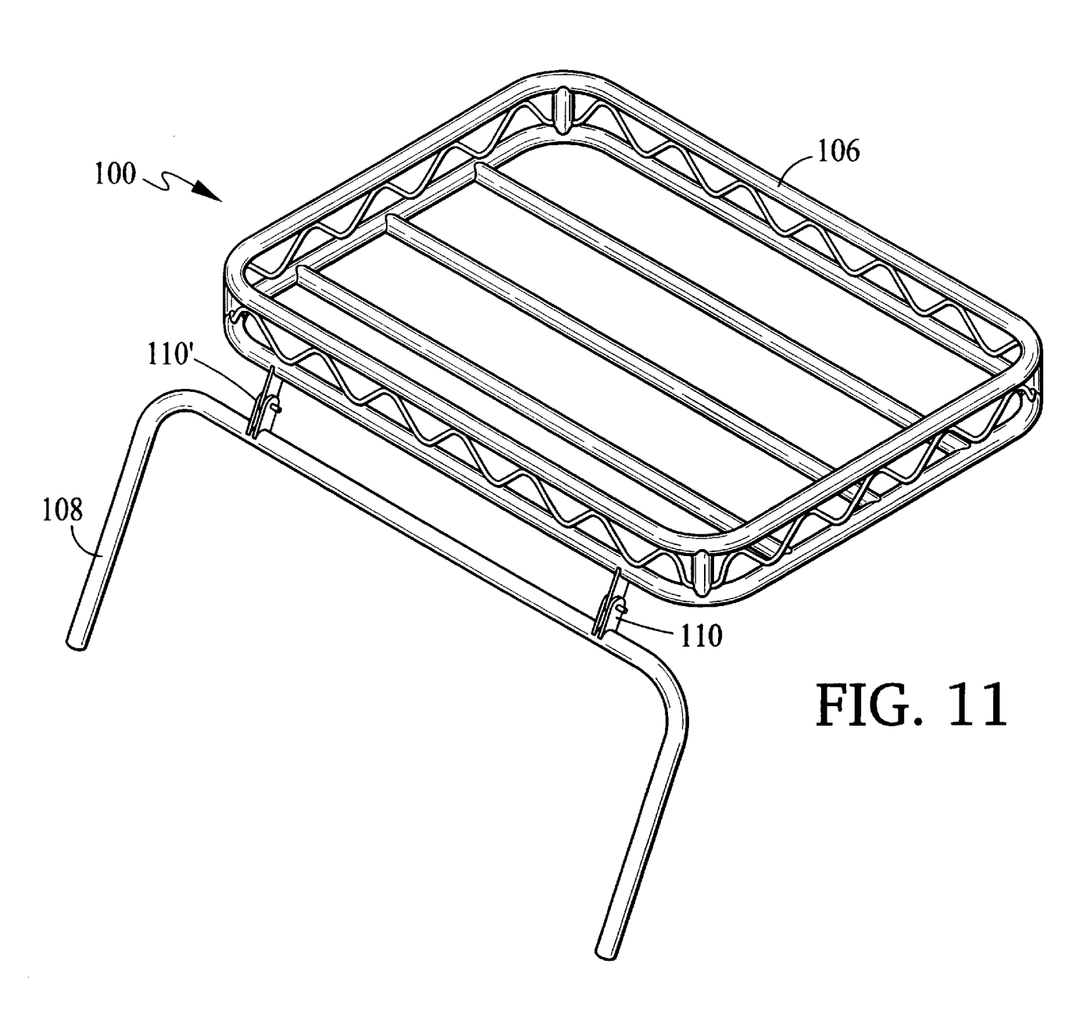
FIG. 11 is a somewhat diagrammatic top perspective view of the vehicle carrier rack assembly of FIG. 10.
Figure 12:
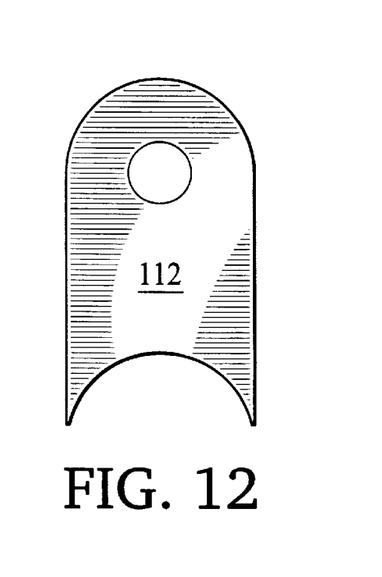
FIG. 12 is face plan view of a hinge element of a hinge assembly of the invention.
Figure 13:
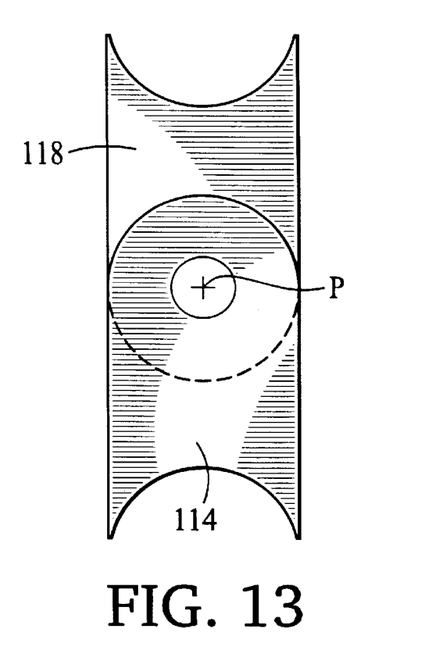
FIG. 13 is a face plan view of a hinge assembly of the invention.
Figure 14:
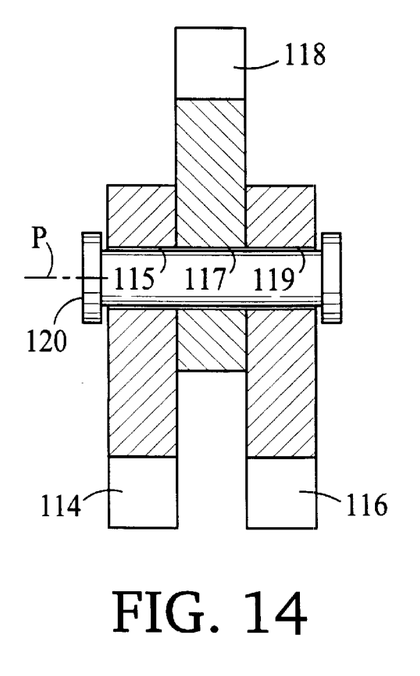
FIGS. 14 and 15 are side section and side plan views, respectively, of the hinge assembly.
Figure 15:
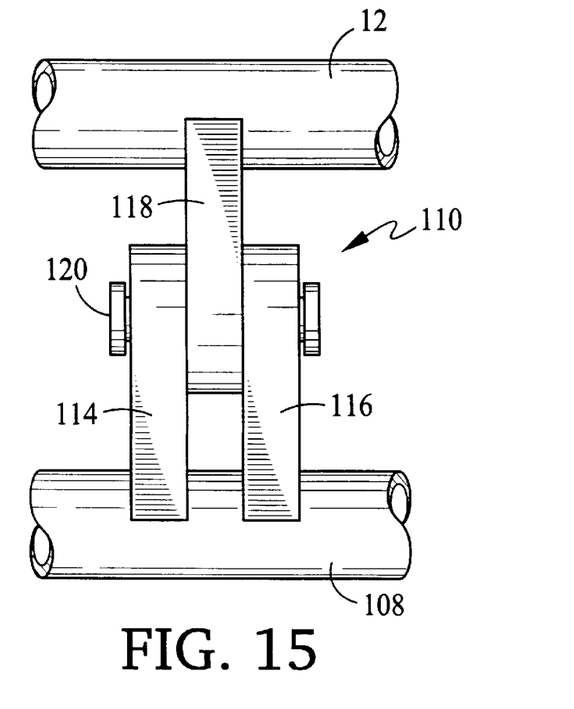

Referring now to FIGS. 10 and 11, according to another aspect of the invention, a vehicle carrier rack assembly 100 for removably mounting upon a vehicle 102 having a roll bar 104 consists of a unitary carrier rack 106, e.g. as described above, a front rack support bar 108 adapted for mounting to windshield brackets 109 of the vehicle, and a pair of carriage rack hinge assemblies 110, 110'. Referring now also to FIGS. 12, 13, 14, and 15, in the preferred embodiment, each carriage rack hinge assembly 110 is formed of hinge elements 112 (FIG. 12), including first and second outer hinge elements 114, 116 extending from the front rack support bar 106, with an inner hinge element 118 extending from the unitary carrier rack 106 and generally between first and second outer hinge elements 114, 116, and a hinge pin 120. The inner hinge element 118 and the first and second outer hinge elements 114, 116 define respective transverse apertures 115, 117, 119 in cooperative alignment for receiving the hinge pin 120 therethrough. As a result of this arrangement, the unitary carrier rack 106 is pivotable about an axis, P, defined by the hinge pin 120, between a first position (shown is solid line in FIG. 10), with the unitary carrier rack 106 disposed adjacent the vehicle roof, and a second position (suggested in dashed line in FIG. 10), with the unitary carrier rack 106 pivoted away and spaced from the area 122 of the vehicle roof.

In preferred embodiments, the vehicle carrier rack assembly includes a cooperative clamping assembly 124, as described above with respect to FIGS. 4–9, with the vehicle carrier rack 106 being constructed and removably mounted to the vehicle roll bar 104. Also in preferred embodiments, the vehicle carrier rack assembly 100 includes a grommet assembly for mounting upon the roof of the vehicle around a hole formed therein for receiving therethrough, in watertight relationship, a portion of each cooperative, releasable engagement assembly, again, as described above with reference to FIGS. 5, 6, 8 and 9.

Referring again to FIG. 10, the vehicle carrier rack assembly 100 may further include a ladder 126 mounted at the rear of the vehicle 102, with its upper end 125 disposed for access to the unitary carrier rack 106. The ladder 126 is preferably mounted by a pair of ladder hinge assemblies 128 consisting, as described above with respect FIGS. 12–14, of first and second outer hinge elements 114, 116, an inner hinge element 118, generally between the first and second outer hinge elements, and a hinge pin 120. The inner hinge element 118, extending from the unitary carrier rack 106, and the first and second outer hinge elements 114, 116, extending from the ladder 126, define respective transverse apertures in cooperative alignment for receiving the hinge pin therethrough. As a result, the ladder is pivotable about an axis, P, defined by the hinge pin 120, between a first position (shown in solid line in FIG. 10), with the ladder 126 extending at the rear of the vehicle 120, with its free end 127 disposed for access from the ground, and a second position (suggested in dashed line in FIG. 10), with the ladder 126 pivoted away and spaced from the rear of the vehicle 102.

A number of embodiments of the invention have been described. Nevertheless, it will be understood that various modifications may be made without departing from the spirit and scope of the invention.

For example, referring to FIG. 3, for mounting a vehicle carrier rack 10 upon a vehicle 6 having rear roll bar members 7 disposed at an angle to the horizontal, a cooperative clamping assembly can be provided with the male engagement element 130 formed at an angle to the roll bar clamp assembly. Other vehicle configurations can also be accommodated, e.g., with similar or other modifications.

Other configurations of the reinforcement members 18 are also envisioned, e.g. a lattice or a series of plates or posts may be employed. Also, although two bottom crossrail members 22 are depicted in FIG. 4, any number may be employed, depending, e.g., on the projected cargo weight and resulting strength required, and also dimensions of length and width of vehicle carrier rack the span of the resulting grid. Similarly, while the elements of the vehicle carrier rack are depicted as rounded or tubular members, other cross sectional shapes may also be employed.

Figure 17:
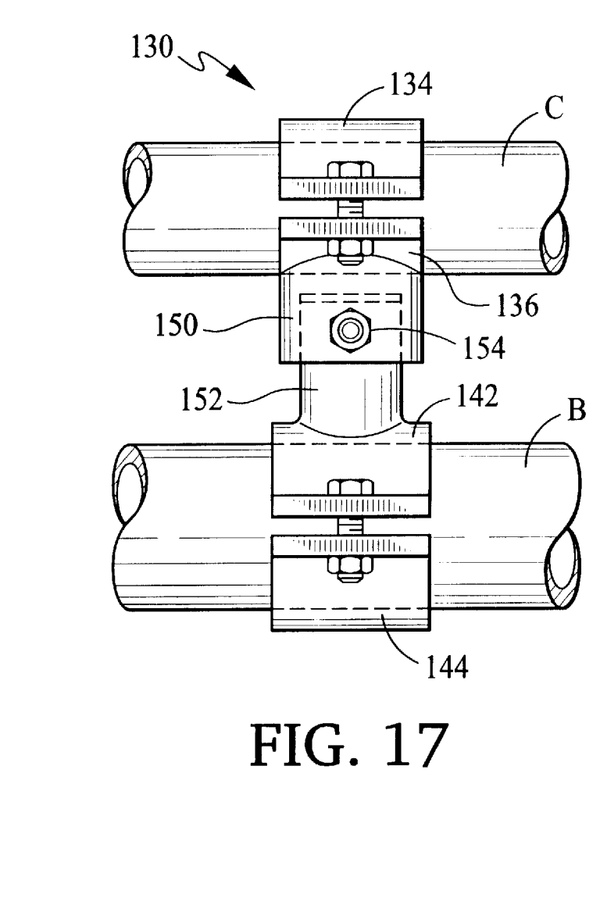

Also, referring to FIGS. 16 and 17, in another embodiment, a cooperative clamping assembly 130 for releasably mounting a carrier rack upon a vehicle roll bar is shown. Carrier rail clamp assembly 132 is engaged about carrier rail, C (i.e., one of a crossrail member 22, a lower siderail member 12, or a bottom rail member 20) as appropriate for the type of vehicle upon which the associated vehicle carrier rack is mounted. Upper rack clamp member 134 and lower rack clamp member 136 are mutually sized and configured to securely clamp about the carrier rail, C, therebetween, held by attachment members 138, e.g., carriage or hex bolts, through holes in flanges 140 provided for that purpose. In this embodiment, and also in the preferred embodiment described above, where rounded stock is used for the rack members, one or both of the clamp members 134, 136 may be grooved, scored, or fabricated with gripping teeth or ridges to aid in gripping the carrier rail, C. Alternatively, rubber or other high-friction material may be placed at the interfaces between the clamp members 134, 136 and the carrier rail, C.

The upper roll bar clamp member 142 and lower roll bar clamp 144 are mutually sized and configured to be secured about the roll bar, B, held together by attachment members 146, e.g., carriage or hex bolts, through holes in flanges 148 provided for that purpose. Again, in this embodiment, and also in the preferred embodiment described above, where rounded stock is used for the roll bar (as is typical), one or both of the clamp members 142, 144 may be grooved, scored, or fabricated with gripping teeth or ridges, as above, to aid in gripping the roll bar, B. Alternatively, rubber or other high-friction material may be placed in the interfaces between the clamp members 142, 144 and the roll bar, B.

The lower rack clamp member 136 is associated with a downward tubular extension 150 engaged in mating, telescopic engagement with an upward cylindrical extension 152 associated with the upper roll bar clamp member 142. In one preferred embodiment, the inside diameter of the downward tubular extension 150 is about 1½ inch, which is approximately the same as the outer diameter of the upward cylindrical extension 152. A pin 154, e.g., a carriage bolt, hex bolt, or the like, is placed through aligned cooperating apertures in the extensions 152, 154 to hold the extensions 152, 154 together.

The orientation of the hinge assemblies 110 between the front rack support bar 108 and the unitary carrier rack 106 and/or between the ladder 126 and the unitary carrier 106, may be reversed, i.e., with the first and second outer hinge elements 114, 116 extending from the unitary carrier 106 and the inner hinge element 118 extending from the front rack support bar 108 and/or from the ladder 126.

Accordingly, other embodiments are within the scope of the following claims.

What is claimed is:

1. A cooperative clamping assembly for releasably mounting a carrier rack upon a vehicle roll bar, comprising:
 a roll bar clamp assembly, comprising:
  a lower roll bar clamp element defining a lower bar clamping surface for engagement with a roll bar surface,
  an upper roll bar clamp element defining an upper bar clamping surface for engagement with a roll bar surface, and
  at least one roll bar clamp assembly securement element securing together said lower roll bar clamp and said upper roll bar clamp, with the roll bar engaged generally within and between opposed said lower bar clamping surface and said upper bar clamping surface;
 a carrier rail clamp assembly, comprising:
  a lower carrier rail clamp element defining a lower rail clamping surface for engagement with a carrier rail surface,
  an upper carrier rail clamp element defining an upper rail clamping surface for engagement with a carrier rail surface, and
  at least one carrier rail clamp assembly securement element securing together said lower carrier rail clamp and said upper carrier rail clamp, with the carrier rail engaged generally within and between opposed said lower rail clamping surface and said upper rail clamping surface; and
 a cooperative, releasable engagement assembly comprising:
  a male engagement element associated with one of said roll bar clamp assembly and said carrier rail clamp assembly,
  a female sleeve element defining a bore for cooperatively receiving said male engagement element extending therewithin and associated with another of said roll bar clamp assembly and said carrier rail clamp assembly, and
  at least one releasable engagement assembly securing element releasably securing said male engagement element in engagement within said bore of said female sleeve element.

2. The cooperative clamping assembly of claim 1, wherein said male engagement element is associated with said roll bar clamp assembly.

3. The cooperative clamping assembly of claim 2, wherein said male engagement element extends generally vertically upward from said upper roll bar clamp element of said roll bar clamp assembly, for releasable engagement extending within said bore of said female sleeve element.

4. The cooperative clamping assembly of claim 1, wherein said female sleeve element is associated with said carrier rail clamp assembly.

5. The cooperative clamping assembly of claim 4, wherein said female sleeve element extends generally vertically downward from said lower carrier rail clamp element of said carrier rail clamp assembly, for releasable engagement of said bore over said male engagement element.

6. The cooperative clamping assembly of claim 1, wherein said male engagement element and said female sleeve element define respective transverse apertures in cooperative alignment with said male engagement element extended within said bore of said female sleeve element, and said at least one releasable engagement assembly securing element extending through said transverse apertures in cooperative alignment, releasably securing said male engagement element against dislodgement from within said bore of said female sleeve element.

7. The cooperative clamping assembly of claim 6, further comprising disengageable interference structure associated with said at least one releasable engagement assembly securing element for resisting dislodgement of said at least one releasable engagement assembly securing element from said transverse apertures in cooperative alignment.

8. A vehicle carrier rack assembly for removably mounting upon a vehicle having a roll bar, said vehicle carrier rack assembly comprising:
 a unitary carrier rack; and
 a cooperative clamping assembly for releasably mounting said unitary carrier rack upon the vehicle roll bar, said cooperative clamping assembly comprising:
  a roll bar clamp assembly, comprising a lower roll bar clamp element defining a lower bar clamping surface for engagement with a roll bar surface, an upper roll bar clamp element defining an upper bar clamping surface for engagement with a roll bar surface, and at least one roll bar clamp assembly securement element securing together said lower roll bar clamp and said upper roll bar clamp, with the roll bar engaged generally within and between opposed said lower bar clamping surface and said upper bar clamping surface,
  a carrier rail clamp assembly, comprising a lower carrier rail clamp element defining a lower rail clamping surface for engagement with a carrier rail surface, an upper carrier rail clamp element defining an upper rail clamping surface for engagement with a carrier rail surface, and at least one carrier rail clamp assembly securement element securing together said lower carrier rail clamp and said upper carrier rail clamp, with said carrier rail engaged generally within and between opposed said lower rail clamping surface and said upper rail clamping surface, and
  a cooperative, releasable engagement assembly comprising a male engagement element associated with one of said roll bar clamp assembly and said carrier rail clamp assembly, a female sleeve element defining a bore for cooperatively receiving said male engagement element extending therewithin and associated with another of said roll bar clamp assembly and said carrier rail clamp assembly, and at least one releasable engagement assembly securing element releasably securing said male engagement element in engagement within said bore of said female sleeve element.

9. The vehicle carrier rack assembly of claim 8, further comprising at least one grommet assembly for mounting upon the roof of the vehicle around a hole formed therein, and receiving therethrough, in water-tight relationship, a portion of said cooperative, releasable engagement assembly, wherein the roof of the vehicle passes between the roll bar of the vehicle and said unitary carrier rack.

10. The vehicle carrier rack assembly of claim 8, wherein said unitary carrier rack has sidewalls and a floor.

11. The vehicle carrier rack assembly of claim 10, wherein said sidewalls of said unitary carrier rack comprise lower and upper siderail members, reinforcement members between said lower and upper siderail members, and corner posts, and said floor of said unitary carrier rack comprises said lower siderail members, bottom rail members and cross rail members.

12. A vehicle with a roll bar and a vehicle carrier rack assembly removably mounted upon said roll bar, said vehicle carrier rack assembly comprising:

a unitary carrier rack; and a cooperative clamping assembly for releasably mounting said unitary carrier rack upon said vehicle roll bar, said cooperative clamping assembly comprising:

a roll bar clamp assembly, comprising a lower roll bar clamp element defining a lower bar clamping surface for engagement with a roll bar surface, an upper roll bar clamp element defining an upper bar clamping surface for engagement with a roll bar surface, and at least one roll bar clamp assembly securement element securing together said lower roll bar clamp and said upper roll bar clamp, with said roll bar engaged generally within and between said lower bar clamping surface and said upper bar clamping surface, a carrier rail clamp assembly, comprising a lower carrier rail clamp element defining a lower rail clamping surface for engagement with a carrier rail surface, an upper carrier rail clamp element defining an upper rail clamping surface for engagement with a carrier rail surface, and at least one carrier rail clamp assembly securement element securing together said lower carrier rail clamp and said upper carrier rail clamp, with said carrier rail engaged generally within and between opposed said lower rail clamping surface and said upper rail clamping surface, and a cooperative, releasable engagement assembly comprising a male engagement element associated with one of said roll bar clamp assembly and said carrier rail clamp assembly, a female sleeve element defining a bore for cooperatively receiving said male engagement element extending therewithin and associated with another of said roll bar clamp assembly and said carrier rail clamp assembly, and at least one releasable engagement assembly securing element releasably securing said male engagement element in engagement within said bore of said female sleeve element.

13. The vehicle of claim 12, further comprising at least one grommet assembly for mounting upon said roof of said vehicle around a hole formed therein, and receiving therethrough, in water-tight relationship, a portion of said cooperative, releasable engagement assembly, wherein said roof of said vehicle passes between said roll bar of said vehicle and said unitary carrier rack.

14. The vehicle of claim 12, wherein said unitary carrier rack has sidewalls and a floor.

15. The vehicle of claim 14, wherein said sidewalls of said unitary carrier rack comprise lower and upper siderail members, reinforcement members between said lower and upper siderail members, and corner posts, and said floor of said unitary carrier rack comprises said lower siderail members, bottom rail members and cross rail members.

16. A vehicle carrier rack assembly for removably mounting upon a vehicle having a roll bar, said vehicle carrier rack assembly comprising:

a unitary carrier rack;

a front rack support bar adapted for mounting to windshield brackets of the vehicle; and at least one carrier rack hinge assembly comprising:

first and second outer rack hinge elements extending from one of said front rack support bar and said unitary carrier rack, an inner rack hinge element extending from another of said front rack support bar and said unitary carrier rack and generally between said first and second outer rack hinge elements, and a hinge pin, said inner rack hinge element and said first and second outer rack hinge elements defining respective transverse apertures in cooperative alignment for receiving said hinge pin therethrough, whereby said unitary carrier rack is pivotable about an axis, defined by said hinge pin, between a first position, with said unitary carrier rack disposed adjacent the vehicle roof, and a second position, with said unitary carrier rack pivoted away and spaced from the vehicle roof.

17. The vehicle carrier rack assembly of claim 16, wherein first and second outer rack hinge elements extend from said front rack support bar, and said inner rack hinge element extends from said unitary carrier rack.

18. The vehicle carrier rack assembly of claim 16, further comprising:

a cooperative clamping assembly for releasably mounting said unitary carrier rack upon the vehicle roll bar, said cooperative clamping assembly comprising:

a roll bar clamp assembly, comprising: a lower roll bar clamp element defining a lower bar clamping surface for engagement with a roll bar surface, an upper roll bar clamp element defining an upper bar clamping surface for engagement with a roll bar surface, and at least one roll bar clamp assembly securement element securing together said lower roll bar clamp and said upper roll bar clamp, with the roll bar engaged generally within and between opposed said lower bar clamping surface and said upper bar clamping surface, a carrier rail clamp assembly, comprising: a lower carrier rail clamp element defining a lower rail clamping surface for engagement with a carrier rail surface, an upper carrier rail clamp element defining an upper rail clamping surface for engagement with a carrier rail surface, and at least one carrier rail clamp assembly securement element securing together said lower carrier rail clamp and said upper carrier rail clamp, with said carrier rail engaged generally within and between opposed said lower rail clamping surface and said upper rail clamping surface, and a cooperative, releasable engagement assembly comprising a male engagement element associated with one of said roll bar clamp assembly and said carrier rail clamp assembly, a female sleeve element defining a bore for cooperatively receiving said male engagement element extending therewithin and associated with another of said roll bar clamp assembly and said carrier rail clamp assembly, and at least one releasable engagement assembly securing element releasably securing said male engagement element in engagement within said bore of said female sleeve element with said unitary carrier rack in said first position.

19. The vehicle carrier rack assembly of claim 17, further comprising at least one grommet assembly for mounting upon the roof of the vehicle around a hole formed therein, and receiving therethrough, in water-tight relationship, with said unitary carrier rack in said first position, a portion of said cooperative, releasable engagement assembly, wherein the roof of the vehicle passes between the roll bar of the vehicle and said unitary carrier rack with said unitary carrier rack in said first position.

20. The vehicle carrier rack assembly of claim 16, further comprising:
- a ladder mounted at the rear of the vehicle; and
- at least one ladder hinge assembly comprising:
  - first and second outer ladder hinge elements extending from one of said unitary carrier rack and said ladder,
  - an inner ladder hinge element extending from another of said unitary carrier rack and said ladder and generally between said first and second outer ladder hinge elements, and
  - a hinge pin,
    - said inner ladder hinge element and said first and second outer ladder hinge elements defining respective transverse apertures in cooperative alignment for receiving said hinge pin therethrough,
    - whereby said ladder is pivotable about an axis, defined by said ladder hinge pin, between a first position, with said ladder extending at the rear of the vehicle, with a first, free end disposed for access from the ground, and a second position, with said ladder pivoted away and spaced from the rear of the vehicle.

21. The vehicle carrier rack assembly of claim 20, wherein said first and second outer ladder hinge elements extend from said unitary carrier rack, and said inner ladder hinge element extends from said ladder.

22. The vehicle carrier rack assembly of claim 20, wherein said ladder has a second, upper end, opposite said first end, with said ladder in said first position, said second end being disposed for access to said unitary carrier rack.

* * * * *